E. J. SOLOMON.
TRACTION WHEEL.
APPLICATION FILED NOV. 10, 1917.
1,377,289.
Patented May 10, 1921.
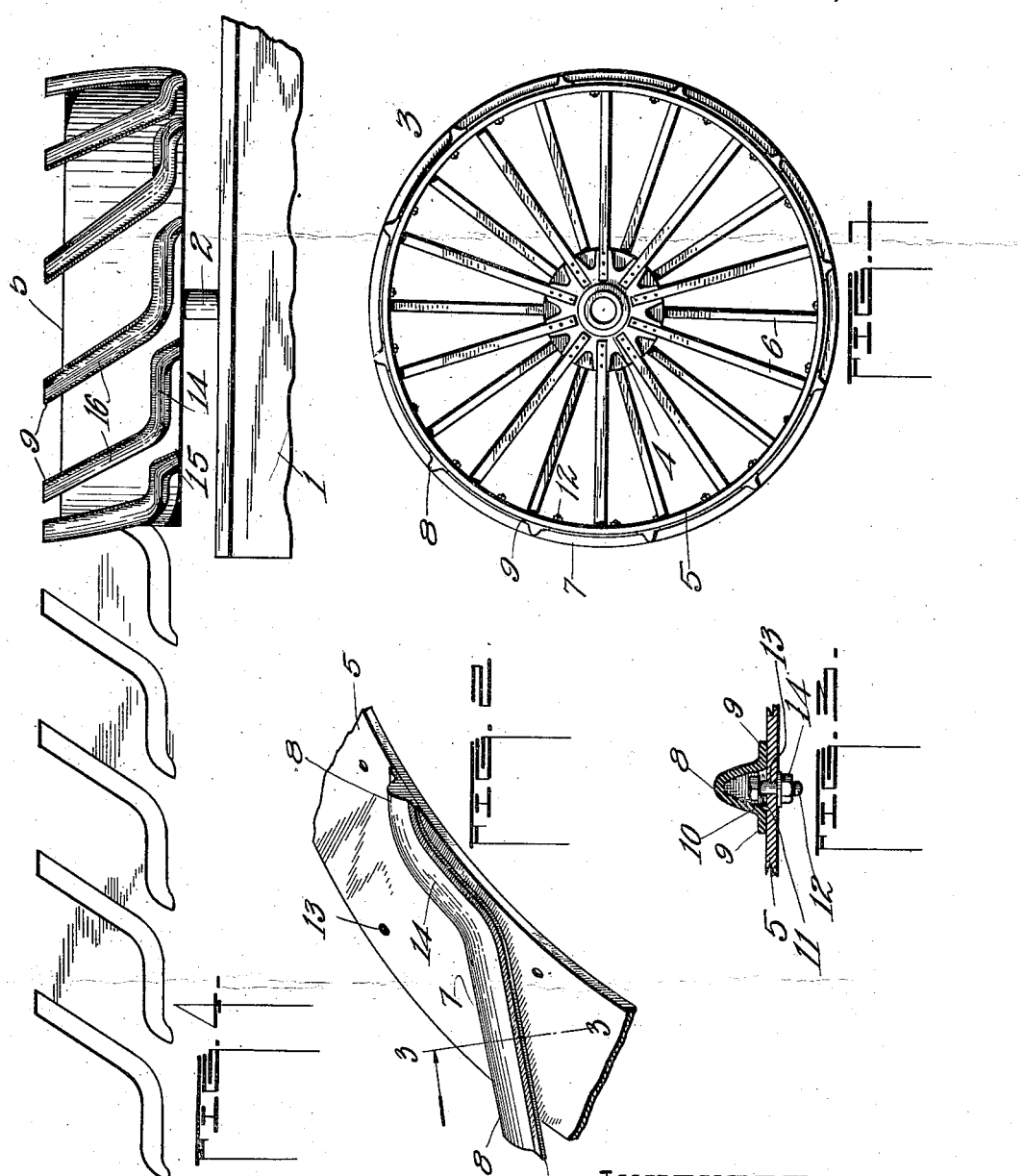
INVENTOR.
Edgar J. Solomon
By H. T. Bliss
ATTYS

UNITED STATES PATENT OFFICE.

EDGAR J. SOLOMON, OF PEORIA, ILLINOIS, ASSIGNOR TO AVERY COMPANY, OF PEORIA, ILLINOIS, A CORPORATION OF ILLINOIS.

TRACTION-WHEEL.

1,377,289.   Specification of Letters Patent.   Patented May 10, 1921.

Application filed November 10, 1917. Serial No. 201,300.

*To all whom it may concern:*

Be it known that I, EDGAR J. SOLOMON, a citizen of the United States, a resident of Peoria, in the county of Peoria and State of Illinois, have invented new and useful Improvements in Traction-Wheels, of which the following is a specification.

This invention relates to improvements in traction wheels, particularly to improvements in the cleats which are employed on the rims of such wheels.

One of the objects of the invention is to provide a wheel structure having cleats of a peculiar conformation adapted to secure a firm hold upon the surface over which the vehicle is traveling; adapted to give continuous peripheral support; and adapted to be attached in such way that they will be firmly held and braced; and which are so positioned and fastened that the periphery of the wheel will be self-cleaning.

Figure 1 is a side elevation of a traction wheel embodying my improvements.

Fig. 2 is a perspective view showing a portion of the rim of the wheel and my improved cleat attached thereto.

Fig. 3 is a cross section of a cleat as the same would appear if taken on line 3—3 of Fig. 2; and Fig. 4 is a plan view of a traction wheel with my improved cleats applied thereto, and also showing the track of the cleats when they leave the ground unbroken.

In the drawings:

1 designates a portion of the body of an engine-driven tractor, and 2 an axle for the rear traction wheels 3. Each of these wheels includes the hub portion 4, the rim 5, and the spokes 6. The rim 5 is a single annulus, or tire element, of sufficient width, with an outer surface which is smooth and unobstructed at all exposed points.

The cleats are indicated by 7, 7. They are formed by casting, or otherwise, in such way as to be tubular or to have interior chambers. As illustrated, each, in cross section, resembles an inverted V, with the apex smooth and rounded as at 8. Its edges along the open side are fitted closely to the outer surface of the rim 5 of the wheel, and, preferably, said edges are widened by narrow flanges 9. Each is formed in three integral sections, 14, 15 and 16. The section 14, when the cleat is fastened on the wheel lies as close as possible to, and parallel with, the inner edge of the rim. These sections 14 of the several cleats are in a plane which is transverse to the axis of the wheel.

The longer element 16 of each cleat is inclined to the section 14 and to the planes of rotation, it extending from said part 14 across the center of the rim and to points beyond its outer edge. The third section 15 is short and extends from the section 14 to, and stops at, the inner edge of the rim 5. In the chamber, or chambers, in the interior of the cleat there are webs 10, with an opening or passage 11, and with these engage the heads of bolts 12, the bolts passing through openings 13 in the wheel rim. The nuts 14 on the bolts draw the cleats tightly to place against the rim surface and lock them rigidly.

The cleat being V-shaped, as described, has two walls which brace each other. And hence it can be made deep, radially, without materially increasing the weight. Of the bolts 12 there can be as many as are necessary for each cleat, two or three being, however, sufficient, one engaging with the outer end part of the longer section 16, and the other, or others, engaging with the sections at 14, 15. The bolt or bolts for the latter sections are placed as near the inner edge of the wheel rim as is permitted by its metal.

The surfaces of all the metallic parts which contact with the earth are perfectly smooth. As shown in Fig. 4, there are no exposed perforations in the rim or in the cleats. No rivet heads, screw heads, or bolts are exposed, yet each cleat is positively and strongly bolted in position. They are so related that there are formed compartments at the surface of the rim, each with three sides, to wit: two provided by the cleat sections 16, and one by the section 14. Each of these compartments is entirely open at the outer edge of the rim. And its side walls are inclined in relation to the direction of travel of the machine.

At the other edge of the rim, the compartment is not entirely closed, the cleats being remote from each other and secured to the rim entirely independently. There is a narrow space between the end of the section 14 of one cleat and the section 16 of the next, and this insures that the indentation in the ground formed by one cleat shall not extend to the indentation formed by the next (see Fig. 4), and the surface stratum of the ground is not broken off as readily as it is where the grooves formed by the cleats in the ground run together.

At times, in any soil, however, earth does tend to pack against the rim in the compartment between the cleats. But as the side walls of these compartments (formed by the parallel sections 16, 16) are, as above set forth, inclined relatively to the lines of advance of the wheel and relatively to the lines of the pressure exerted by the soil, the cakes of clay or similar material which, during one revolution, are packed into said compartments, are, during the next revolution, squeezed or pressed outward away from the engine and beyond the outer edge of the rim. And the surfaces of the rim and the cleats being smooth and unbroken, the periphery is self-cleaning. The cakes are driven practically across the entire width of the rim, and outward. None of the soil is pressed inward toward the engine.

The section 14 of each cleat lies partly, in the radial planes of the outer part of the next section 16; and consequently there is practically a continuous tread upon which the wheel rests when traveling over hard material. These sections 14 are also used to brace the sections 16, the latter not having any outside bolts or rivets and being subjected to severe twisting and breaking strains when held by interior fasteners.

What I claim is:

1. A traction wheel having, in combination, a rim, and a series of cleats, each cleat having a section adapted to lie with its longitudinal lines in a plane of rotation, close to the inner edge of the rim, and a second section positioned with its longitudinal lines in planes inclined to the aforesaid planes, said cleats being arranged to form compartments with diagonal parallel sides at the surface of the rim, each compartment approximating in length the width of the rim, and being entirely open and unobstructed on transverse lines at the outer edge of the rim, and having a narrow opening near the inner edge of the rim between one cleat and the next.

2. A traction wheel having, in combination, a single transversely continuous rim, and a series of cleats thereon, each cleat having a section adapted to lie with its longitudinal lines in planes of rotation near the inner edge of the rim, and a second section integral with the first and positioned with its longitudinal lines in planes inclined to the aforesaid planes, the cleats being out of contact with each other and arranged to form soil receiving compartments at the rim surface, each compartment having inclined sides and being entirely open laterally at the outer edge of the rim and partially closed by adjacent cleats at points near the inner edge of the rim.

In witness whereof, I have hereunto affixed my hand this 31st day of October, 1917.

EDGAR J. SOLOMON.